US011087052B2

(12) United States Patent
Boulkenafed et al.

(10) Patent No.: US 11,087,052 B2
(45) Date of Patent: *Aug. 10, 2021

(54) AUTOMATIC PARTITIONING OF A 3D SCENE INTO A PLURALITY OF ZONES PROCESSED BY A COMPUTING RESOURCE

(71) Applicant: DASSAULT SYSTEMES, Velizy Villacoublay (FR)

(72) Inventors: Malika Boulkenafed, Courbevoie (FR); Philippe Robert Felix Belmans, Paris (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/824,372

(22) Filed: Mar. 19, 2020

(65) Prior Publication Data

US 2020/0218838 A1 Jul. 9, 2020

Related U.S. Application Data

(63) Continuation of application No. 15/845,620, filed on Dec. 18, 2017, now Pat. No. 10,671,773.

(30) Foreign Application Priority Data

Dec. 21, 2016 (EP) .................... 16306766

(51) Int. Cl.
*G06F 30/20* (2020.01)
*G06T 15/00* (2011.01)
(Continued)

(52) U.S. Cl.
CPC .............. *G06F 30/20* (2020.01); *A63F 13/00* (2013.01); *G06F 30/13* (2020.01); *G06T 7/11* (2017.01);
(Continued)

(58) Field of Classification Search
CPC ......... A63F 13/12; G06F 9/5061–5077; G06T 17/00; G06T 17/005
See application file for complete search history.

(56) References Cited

U.S. PATENT DOCUMENTS 6,055,563 A * 4/2000 Endo .................. G06T 1/00
709/203
9,454,842 B2 * 9/2016 Belmans ................ G06T 15/08
(Continued)

FOREIGN PATENT DOCUMENTS

EP 2 745 892 A1 6/2014

OTHER PUBLICATIONS

Ahmed, Dewan Tanvir, and Shervin Shirmohammadi. "A microcell oriented load balancing model for collaborative virtual environments." Virtual Environments, Human-Computer Interfaces and Measurement Systems, 2008. VECIMS 2008. IEEE Conference on. IEEE, 2008. (Year: 2008).*

(Continued)

*Primary Examiner* — Ryan McCulley
(74) *Attorney, Agent, or Firm* — Oblon, McClelland, Maier & Neustadt, L.L.P.

(57) ABSTRACT

Described is a computer-implemented method for partitioning a 3D scene into a plurality of zones, each zone representing an area or a volume of the 3D scene and being processed by a computing resource. The method comprises obtaining a 3D scene comprising one or more objects, each object generating a computing resource cost, computing a first map that represents a density of computing costs of the provided 3D scene, defining a second map that represents constraints on the shapes of zones that will be obtained as a result of a partitioning of the 3D scene, discretizing the obtained 3D scene into cells by computing a space quantization of the 3D scene free of dynamic objects, computing, for each cell, a computing cost from the first map of the 3D (Continued)

scene, aggregating the cells into one or more zones in accordance with the second map.

19 Claims, 6 Drawing Sheets

(51) Int. Cl.
| | |
|---|---|
| G06T 7/11 | (2017.01) |
| G06T 19/20 | (2011.01) |
| A63F 13/00 | (2014.01) |
| G06F 30/13 | (2020.01) |
| G06T 17/00 | (2006.01) |
| G06F 111/04 | (2020.01) |

(52) U.S. Cl.
CPC ............ G06T 15/005 (2013.01); G06T 17/00 (2013.01); G06T 19/20 (2013.01); *G06F 2111/04* (2020.01); *G06T 2210/52* (2013.01); *G06T 2219/2008* (2013.01)

(56) References Cited

U.S. PATENT DOCUMENTS

| | | | | |
|---|---|---|---|---|
| 2006/0168107 | A1* | 7/2006 | Balan | G06F 9/505 709/218 |
| 2009/0157853 | A1* | 6/2009 | Doi | G06F 16/29 709/220 |
| 2010/0113159 | A1* | 5/2010 | Chapman | A63F 3/04 463/42 |
| 2010/0287207 | A1* | 11/2010 | Motoyama | G06F 16/29 707/803 |
| 2014/0176552 | A1* | 6/2014 | Belmans | G06T 15/08 345/427 |
| 2018/0060138 | A1* | 3/2018 | Whitehead | G06F 17/5009 |
| 2018/0096514 | A1* | 4/2018 | Boulkenafed | G06F 17/50 |

OTHER PUBLICATIONS

Korošec, Peter, Jurij Šilc, and Borut Robič. "Solving the mesh-partitioning problem with an ant-colony algorithm." Parallel computing 30.5-6 (2004): 785-801. (Year: 2004).*

Ng, Beatrice, et al. "A multi-server architecture for distributed virtual walkthrough." Proceedings of the ACM symposium on Virtual reality software and technology. ACM, 2002. (Year: 2002).*

Partial Search Report dated Apr. 15, 2017, in European Patent Application No. 16306766.3-1502 (22 pgs).

Z. D. Wu; "Resource-Cost Analysis for Massively Multiplayer Online Games"; $22^{nd}$ International Conference on Advanced Information Networking and Applications—Workshops; XP-002768992; 8 pages.

Xinbo Jiang, et al., "Supporting a Seamless Map in Peer-to-Peer System for Massively Multiplayer Online Role Playing Games", $33^{rd}$ IEEE Conference on Local Computer Networks (LCN 2008)—Oct. 14-17, 2008—Montreal, Que, Canada, IEEE, Piscataway, NJ, USA, Oct. 14, 2008, 8 pages.

Alexandre Denault, et al.; "Triangle-based Obstacle-aware Load Balancing for Massively Multiplayer Games", Network and Systems Support for Games (NETGAMES) 2011, $10^{th}$ Annual Workshop ON, IEEE, Oct. 8, 2011; 6 pgs.

John C.S. Lui, et al.; "An Efficient Partitioning Algorithm for Distributed Virtual Environment Systems", IEEE Transactions on Parallel and Distributed Systems, vol. 13, No. 3 Mar. 2002; 19 pgs.

* cited by examiner

AUTOMATIC PARTITIONING OF A 3D SCENE INTO A PLURALITY OF ZONES PROCESSED BY A COMPUTING RESOURCE

CROSS-REFERENCE TO RELATED APPLICATIONS

This application is a continuation application of, and claims the benefit of priority under 35 U.S.C. § 120 from, U.S. application Ser. No. 15/845,620, flied Dec. 18, 2017, which claims the benefit of priority under 35 U.S.C. § 119 or 365 to European Application No. 16306766.3, filed Dec. 21, 2016. The entire contents of the above application(s) are incorporated herein by reference.

FIELD OF THE INVENTION

The invention relates to the field of computer programs and systems, and more specifically to a method, system and program for partitioning a three-dimensional scene into a plurality of zones, each zone being processed by a computing resource.

BACKGROUND 3D simulation has known a great success during the last three decades in various and large audiences of users: from engineers verifying how a system in design stage will behave in reality, to scientists exploring or demonstrating theoretical conceptions, to general public playing video games or enjoying 3D animation films. 3D simulation knows many evolutions over the past three decades and is still having a growing momentum. Especially, 3D simulation aims at answering users' needs for more complex and more realistic behaviors (Multi-Body Rigid Dynamics, Human Simulation, Cloth Simulation, Particle Simulation . . . ), for wider populations and typologies of objects and for wider scale.

3D simulation has to meet real-time requirements, which was more particularly initiated in the video game industry, by developing specific technologies to support a massive number of users interacting in large scale virtual worlds. A real-time response has to be offered at any time to the connected users, regardless of their number, and regardless of the induced computation costs for solving and rendering of the application.

Massively Multi-user On line applications (MMOs) allow many users to simultaneously use an application such as real-world phenomena simulator, immersive applications, and so on. Similarly, Massively Multi-user Online Games (MMOG) allow many gamers to play simultaneous a video game. MMOs and MMOGs notably rely on computer networks, e.g. the Internet, for allowing the users or gamers to connect to the applications or video games. Throughout this specification, the word "application" and "video games" will be understood as to be synonymous, and the terms MMO and MMOG will be indifferently used.

MMOs involve complex and large virtual environments which are desired to be rendered in as much detail as possible, in as close to real time as possible, in order to provide users or game players with a more realistic experience. MMOs are specifically designed for the representation and the manipulation of 3D scenes, and are typically used on the end-user's computer for applications that require interactive, sequential, real-time 3D scene generation. As the user interacts with the 3D scene, the computer redraws the 3D representations rapidly enough to convey to the user the sense of a continuous, ongoing reality in which the user is participating. The scene is composed of many separate objects that can be manipulated by user when interacting with the 3D scene. Thus, MMOs involve large data volumes, high data rates and high data complexity is generally required in order to manage large numbers of users participating in real time in a spatially complex and highly detailed virtual environment.

MMOs are typically used for simulating real-world phenomena within computer models; for instance, Multi-Body Rigid Dynamics, Human Simulation, Cloth Simulation, Particle Simulation. Simulations require accurate data and algorithms that describe real-world phenomena, such as the physical properties (strength, elasticity, etc.) of the materials used in a manufacturing process and the product to create a simulation of the process and a simulation of a product in use. 3D CAD/CAM (Computer Aided Design, Computer Aided Manufacturing) tools allow to create 3D representations of the product or component parts. MMO is also referred to as 3D experience, that is, a virtual environment in which engineers study the behaviors of objects; typically, the simulated environment is an industry environment. The expressions "3D scene" and "3D experience" are synonyms.

MMO's, just like MMOG's, must be scalable to dynamically adapt to the perpetually changing work-load, maintaining thus real-time performance. Scalability notably comprises the number of users that can simultaneously use the application, the number of computing resources for computing the simulations, the number of simultaneous interactions between objects of the 3D scene allowed by the application, and so on.

For MMOG's, the number of users may vary significantly, as well as the positional and graphical attributes of all contained dynamic objects; the dynamic objects are objects likely to move in the scene. Nevertheless, the surrounding scenery is set once for all and the typology of dynamic objects and the supported behavior classes are predefined, before the game starts. Said otherwise, 3D scenes in MMOGs comprise a number of predetermined characteristics that strongly limit is the needs of computing resources; thus improving scalability. Forecasting the needs of computing resources is thus possible.

On the contrary, for advanced MMOs, the scenery and population typology of the 3D scene can evolve and enrich, especially while application is running. Indeed, MMOs aim at simulating real-world phenomena, wherein the behavior of objects is dynamic and excludes predefined behavior classes. Consequently, 3D scenery in MMOs cannot use predefined characteristics as for MMOGs.

Thus, even if a 3D Experience has the same kind of real-time and massiveness constraints as MMOG, it has a specific and stringent requirement for far more sophisticated, realistic and accurate physical behaviors, therefore demanding computational power.

One single computing resource cannot cope with all the solving computations in real-time, and for that reason parallelization techniques are required. In few words, the 3D Experience is partitioned into so called zones (also referred to as parts), each of the zones dealing with a specific spatial region of the 3D Experience. The size of these zones is important as it determines whether or not the zones can be computed by a computing resource in real-time. The way a 3D scene (also referred to as 3D experience) is divided into parts is primordial, that is, how the zones are delimited.

The most important requirement when delimiting the zones is that the simulation of each zone always induces a load strictly below 100% of the computing resource to achieve real-time; for instance, below 95% to keep a security margin. There is almost an infinite number of zones suitable for the 3D Experience, but few comes up with the optimal, i.e. smallest number of parts, for which the very same number of computing resources will be sufficient to run simulation in real-time. Performing this selection manually is an enormous time consuming task and it is not efficient as all solutions cannot not manually be explored; thus, the best solutions with the smallest number of zones cannot be obtained within a reasonable time frame when their selection is manually performed.

This problem can be formulated as a continuous problem, where parameters characterizing the solutions are continuously and simultaneously tuned to explore all possibilities, searching the one which fits the best the criteria. When applicable, this option is the most efficient and best quality technique. However, few characterizations (e.g. the number or parts, the number of border points in case they are chosen to be polygons . . . ) are not continuous by nature, and the so usual associated techniques need additional expensive artefacts and turn out to be impracticable to solve this problem.

Within this context, there is still a need for an improved method, computer program, and system for improving the partitioning a 3D scene into a plurality of zones that are processed by computing resources.

SUMMARY OF THE INVENTION

It is therefore provided a computer-implemented method for partitioning a 3D scene into a plurality of zones. Each zone represents an area or a volume of the 3D scene and is processed by a computing resource. The method comprises:
  providing a 3D scene comprising one or more objects, each object generating a computing resource cost;
  computing a first map that represents a density of computing costs of the provided 3D scene;
  defining a second map that represents constraints on the shapes of zones that will be obtained as a result of a partitioning of the 3D scene;
  discretizing the provided 3D scene into cells by computing a space quantization of the 3D scene free of dynamic objects, a dynamic object being an object that can potentially move in the 3D scene;
  computing, for each cell, a computing cost from the first map of the 3D scene;
  aggregating the cells into one or more zones in accordance with the second map, each zone having a computing cost that is the sum of the computing costs of the cells belonging to the zone, the computing cost of the zone allowing a real-time simulation of the zone on a computing resource.

In examples, the method may comprise one or more of the following:
  the aggregation of the cells into one or more zones is further carried out with a combinatorial optimization algorithm;
  the combinatorial optimization algorithm is an Ant colony algorithm;
  before the aggregation of the cells: computing one or more clusters of one or more cells in accordance with the second map; and wherein the aggregating step comprises aggregating the clusters into one or more zones, each zone having a computing cost that is the sum of the computing costs of the cells belonging to the zone, the computing cost of the zone allowing a real-time simulation of the zone on a computing resource;
  the constraints on the shapes of the zones represented on the second map are obtained by identifying in the 3D scene one or more static objects of the 3D scene, a static object being an object that that cannot move in the 3D scene and that cannot be traversed by another object; and for each static object identified, computing a geometry that is associated with a rule that creates one or more clusters of one or more cells;
  the association of a geometry and a rule for creating clusters of cells is one among: the geometry is a polygon and the rule creates a cluster of the cells that are included in the polygon; the geometry is a polygon and the rule creates a cluster of the cells that extends from the polygon according to a direction and a magnitude that are represented by a vector; the geometry is a polyline and the rule triggers the creation of a cluster for each cell that border the polyline;
  the identification in the 3D scene of one or more static objects of the 3D scene is performed upon user action;
  the association of a rule with a computed geometry is performed upon user action;
  the computation of the first map that represents a density of computing costs of the provided 3D scene comprises: determining a set of locations in the 3D scene; filling each location with its maximum occupancy of objects that reaches the most expensive computing cost; computing, for each location of the 3D scene, the maximum computing cost;
  for each location, computing a ratio P/A, wherein P is a measured percentage of a computing resource required for processing the location and A is an area of the location in the three-dimensional scene.
  the step of filling each location with its maximum occupancy of objects is performed for dynamic objects;
  the computation of the space quantization of the 3D scene comprises: computing a surface quantum Sq defined by the relation $S_q = (CPU_{CA})/(\text{density of computing costs})_{Max}$ wherein $(CPU_{CA})$ represents an accuracy of a computer resource cost for processing the zones and (density of computing costs), is the highest density represented on the first map; and discretizing the provided 3D scene into cells, each cell having a size equal to the surface quantum Sq;
    computing, for each cell, a computing cost from the first map of the 3D scene comprises computing the product between the surface quantum Sq and density of computing cost of the cell;
    an objective function of the combinatorial optimization algorithm is formulated for increasing at least when a number N of zones has increased as a result of a new aggregation of the cells into one or more zones; the shapes of zones are jagged border; the number of disconnected zones is larger than zero.

It is further provided a computer program comprising instructions for performing the method.

It is further provided a computer program comprising instructions for performing the method.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
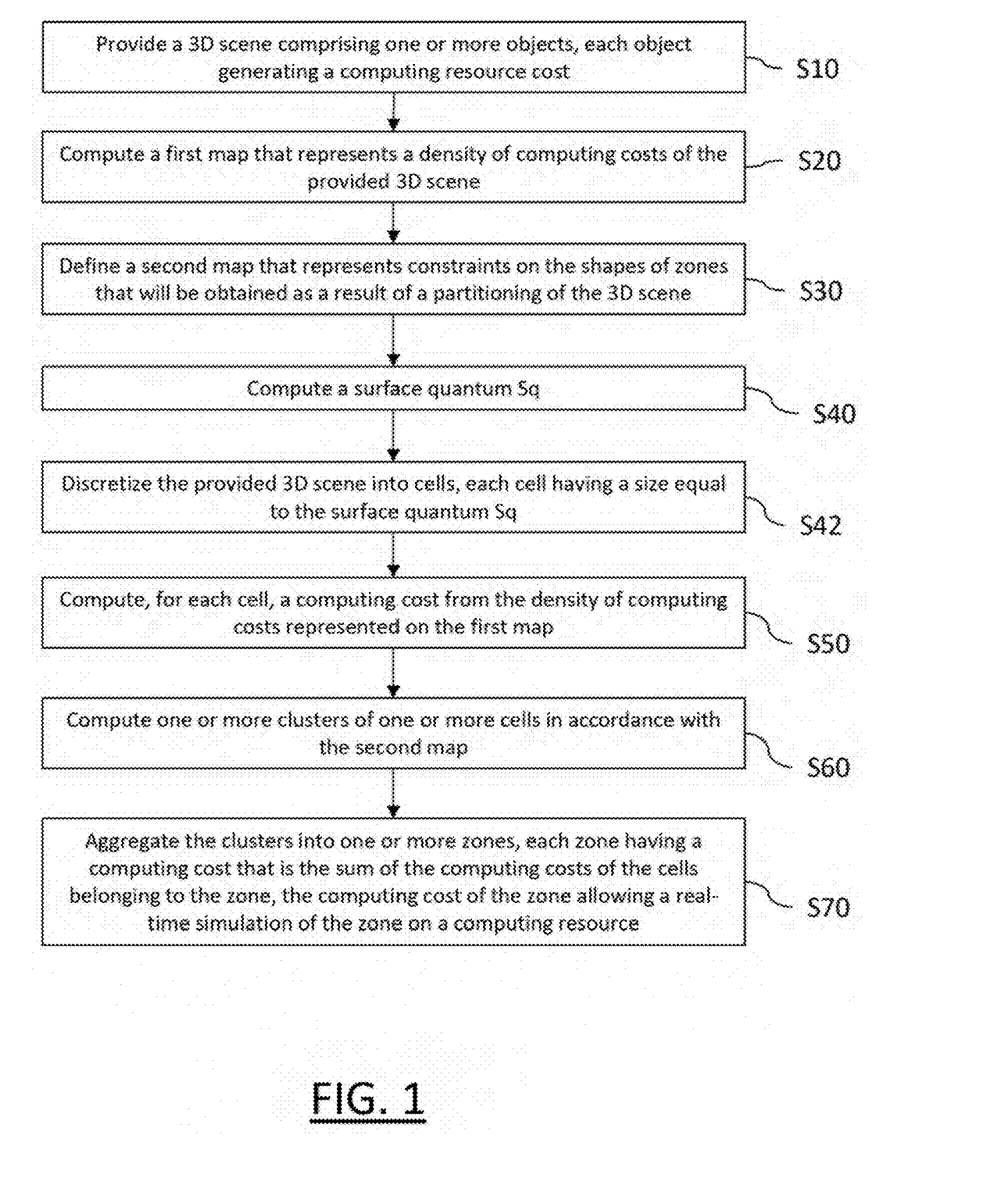
FIG. 1 shows a flowchart of an example of the method.

In reference to the flowchart of FIG. 1, it is proposed a computer-implemented method for partitioning a three-dimensional (3D) scene into a plurality of zones. The 3D scene is thus partitioned into a set of zones. Each zone of the set represents an area of the 3D scene, or a volume of the 3D scene. Each zone is processed by a computing resource. In practice, each zone is assigned to a solver and each solver runs on its own dedicated computing resource; the computing resource may be, but is not limited to, a solving thread on a CPU, on a multi-core CPU, a process on a multi-CPU computer, server process on a server CPU . . . . Thus, the views "solver" and "computing resource" are strictly equivalent in term of load and performance. The term "solver" and the expression "computing resource" are thus synonyms in the present invention. The method comprises providing a 3D scene that comprising one or more objects. Each object generates a computing resource cost, e.g. for instantiating the object in the 3D scene, for computing the representation of the object in the 3D scene, and so on . . . . The method further comprises computing a first map that represents a density of computing costs of the provided 3D scene. The method comprises defining a second map that represents constraints on the shapes of zones that will be obtained as a result of a partitioning of the 3D scene, e.g. upon user action. The method also comprises discretizing the provided 3D scene into cells by computing a space quantization of the 3D scene free of dynamic objects that are objects that can potentially move in the 3D scene. The method further comprises computing a computation cost of each cell from the first map. The method additionally comprises aggregating the cells into one or more zones in accordance with the second map. Each zone has a computing cost that is the sum of the computing costs of the one or more cells that belong to the zone. The computing cost of the zone allows a real-time simulation of the zone on a computing resource; said otherwise, the computation a time step of a simulation of the 3D scene is always done before a new time start.

Such a method improves the partitioning a 3D scene into a plurality of zones that are processed by computing resources. Notably, the first and second maps provide representations of information extracted from the 3D scene. The extracted information allows computing a minimal discretization of the 3D scene that respects intrinsic characteristics of the 3D scene such as for instance static objects of the 3D scene and extrinsic characteristics of the 3D scene such as the computing costs on the computing resource for simulating the 3D scene. This minimal discretization of the 3D scene allows reducing the number of combinations of aggregations of cells. By this way, the best solution(s) with the smallest number of zones can be obtained as a result by use of combinatorial approach, where solution(s) can be formulated as arrangement(s) of a huge and finite number of specific elements. Solution(s) can be obtained within a reasonable time frame, and the partitioning can be automatically carried out, that is, without any user interventions. Further advantages of the present invention will be discussed.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the step of providing the 3D scene may be performed upon user selection; the user may carry out the selection via a haptic device such as a keyboard, a mouse, a stylus, or the like. For instance, in a two-button mouse, the left button could be used for selecting the scene in a list of scenes. The system may also identify by default a scene, i.e. without requiring user selection.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the database may store the 3D scene, one or more objects of the 3D scene. The 3D scene may be stored independently of the one or more objects, e.g. on another database. The database may further comprise a computer program comprising instructions for execution by the system. The instructions are adapted for performing the steps of the present method.

The method generally manipulates modeled objects that are in the 3D scene. The 3D modeled objects form the 3D scene. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. The system may be also MMO or MMOG system wherein a 3D scene and/or 3D modeled objects are simulated or played. The 3D modeled objects used in MMO/MMOG systems may have been designed with a CAD system.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of the invention, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D scene and the one or more 3D modeled objects in the 3D scene may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semi-conductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round) and/or standard surfacing features (e.g. sweep, blend, loft, fill, deform, and/or smoothing). Many CAD systems supporting such modeling functions are history-based system. This means that the creation history of design features is typically saved through an acyclic data flow linking the said geometrical features together through Input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique Involves the modeling and analysis of complex systems composed a plurality components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 9:
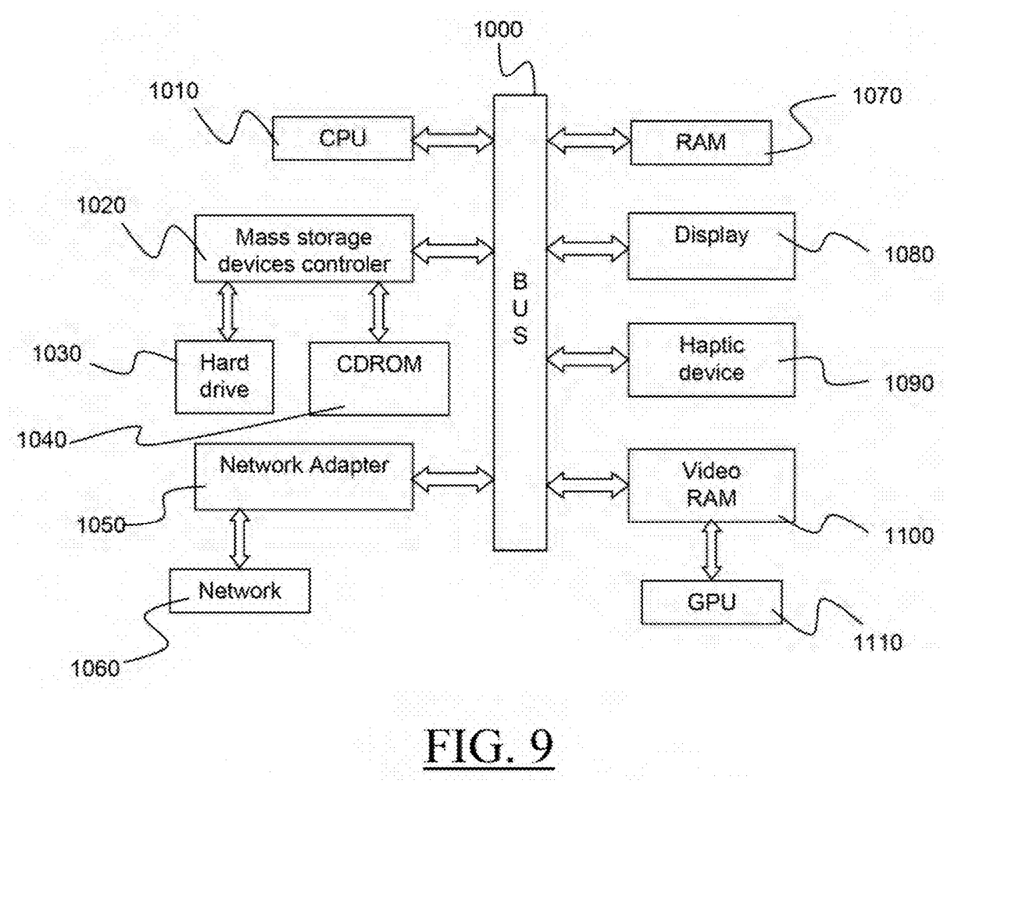
FIG. 9 shows an example of the system.

FIG. 9 shows an example of the system, wherein the system is a client computer system, e.g. a workstation of a user. The system may be a server, e.g. the server comprises the database.

The client computer of the example comprises a central processing unit (CPU) 1010 connected to an internal communication BUS 1000, a random-access memory (RAM) 1070 also connected to the BUS. The client computer may further comprise with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively, or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Partitioning a 3D scene" designates the process of preparing the running a model, e.g. the 3D scene is simulated or played. The model, e.g. the 3D scene, imitates the operation of a real-world system over time. For instance, the 3D scene comprises 3D modeled objects, and each 3D modeled object reproduces (or models) a piece of the system modeled by the 3D scene. The 3D modeled objects may represent the geometry of a product to be manufactured in the real world subsequent to the completion of its virtual design with for instance a CAD software solution or CAD system and to the completion of its simulation with for instance a MMO application.

The method may be included in a manufacturing process, which may comprise, after creating the 3D scene, partitioning the 3D scene and simulating the partitioned 3D scene. The simulated 3D scene may be then produced, that is, a physical product corresponding to the modeled system is produced. In any case, the 3D scene simulated by the method may represent a manufacturing object. Because the method improves the simulation of a 3D scene, the method also improves the manufacturing of a product and thus increases productivity of the manufacturing process.

Referring now to FIG. 1, at step S10, a 3D scene is provided, that is, a computerized system (e.g. the system of FIG. 9) can access data of the 3D scene; for instance, the 3D scene is loaded on memory of the system.

A 3D scene is a space in which spatial relationships between objects are described. The scene is comprised of at least two objects, and the objects may be, but not limited to, modeled objects or 3D modeled objects. A 3D modeled object is a description of an object in a 3D space. A 3D scene is a model of a physical universe, which may be mathematically represented by a geometry which describes every point in 3D space by means of coordinates. The 3D scene is typically a real-world simulated wherein realistic interactions between the objects are simulated. The expression realistic interactions means that the simulated interactions reflects the interactions of the real-world, e.g. physical laws such that forces/efforts (gravity, magnetism, contact), control laws such that information flow, control events . . . . The one or more objects evolve in the 3D scene and are subject to the laws of the simulated real-world, e.g. two objects cannot intersect each other. The 3D scene comprises a layout that can be modified for the purpose of specific scenarios. A scenario describes at least foreseeable interactions of the one or more objects in the 3D scene. The scenario thus describes one way that the 3D scene is or is envisaged to be used in the context of an activity. Each specific scenario will be simulated on the layout. It is to be understood that the scenario may be defined by the user.

Each object of the 3D scene generates a computing resource cost. The objects on the 3D scene are instantiated objects, as known in the art. An object generates a computing cost when it is instantiated in the 3D scene. The computing cost of an instantiated object is a function of the parameters of the instantiation. These parameters of the instantiation may be, but not limited to, the selected complexity of the 3D mesh of the object, the precision of the textures, reflection and shading of the object in the 3D scene, properties associated to dynamical behavioral such that contact/collision, elasticity, heat transfer . . . . It is to be understood that the generated computing cost is maximum when the instantiation parameters are maximal (e.g. instantiation with a maximal realism) for a maximum number of objects on a location.

In general, the expression "cost of computing resource" refers to a percentage of the computing resource required for computing an object, e.g. during a time step of simulation of the 3D scene.

The computation of an object is typically carried out by a solver. A solver is a piece of code that can be executed by the computer program that simulates the 3D scene. A set of solvers thus simulate the complete 3D scene. It is assumed that each solver runs on its own dedicated computing resource that can range, but is not limited to, from a solving thread on a multi-core CPU, a process on a multi-CPU computer, to a server process on a server CPU. And so, the views "solver" and "computing resource" are strictly equivalent in term of load and performance. The expression "computing resource" is therefore synonym of the term "solver".

Figure 2:
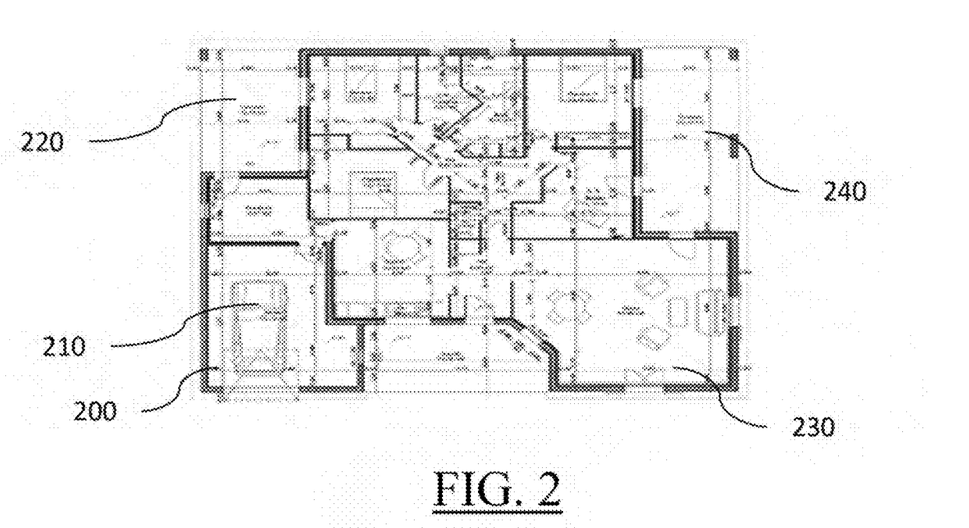
FIG. 2 shows an example of 3D experience.

FIG. 2 shows a top view of an example of a 3D scene that models and simulates a house, where pieces of furniture can be populated and displaced, wall papers can be changed and where humans can evolve. The 3D scene comprises two kind of objects. The first one is called dynamic object. A dynamic object is an object that can potentially move in the 3D scene. For instance, the objects modeling humans that evolve in the 3D scene are dynamic objects. Similarly, the objects modeling pieces of furniture can be moved and are dynamic objects. The dynamic objects move or be displaced in the 3D scene automatically or upon user's action. The second type is called static objects. A static object cannot move in the 3D scene and cannot be traversed by another object. Dynamic objects are thus opposed to static objects.

The set of static objects of the 3D scene form the layout of the 3D scene. For instance, the walls of the house of FIG. 2 are static objects and they are part of the layout of the 3D scene. Other objects of the 3D scene such as the car do not belong to the layout because these objects are not static objects: indeed, a car is an object that can be moved, unless the car is designed to be part of the layout and is in this case a static object.

In the 3D scene, the lists of dynamic objects and of possible actions are not extensive and depend on the purpose the application and on the nature of supported scenarios by the 3D scene. The 3D scene represented on FIG. 2 is permanently running or processed by computing resources. This involves that, meanwhile, users log in/out at any time, new pieces of furniture can be added the mall and start business, a new wall may be added or removed . . . . In other words, the layout can be modified and the dynamic objects may also be modified; for instance, customers may be suppressed, added, or even modified. The 3D scene may thus be contemplated as comprising a layout of static objects and a set of dynamic object moving/evolving in said layout.

Still in reference to FIG. 2, the 3D scene has been projected on a plane, which is the case of most 3D scenes such as digital mockups of buildings factories. The plane represents in this example the ground of the simulated house. By definition, the 3D scene is a volume. The projection comprises the extraction of a print of the 3D scene: this means that a projection of the volume of the 3D scene is performed on a projection plane (e.g. the ground of the house) following a direction, that is, the projection is constructed by linearly mapping points in 3D space to points on a two-dimensional projection plane. In the example of FIG. 2, the direction of the projection is perpendicular to the ground of the house. This allows obtaining a complete representation of the static objects that cannot be traversed by the dynamic objects moving on the ground.

Back to FIG. 1, at step S20, a first map is computed that represents a density of computing costs of the provided 3D scene. The first map plots the percentage of a computing resource it takes per unit of surface for simulating the 3D scene, e.g. during a time step of simulation of the 3D scene.

The first map may be established as disclosed in the document EP2745892 (A1) published on 25 Jun. 2014. For the sake of explanation, an example of computation of the first map is now discussed. In a first step, a set of locations in the 3D scene is determined. A location is a part of the 3D scene that is reachable by an object of the 3D scene. Typically, a location of the 3D scene is reachable by a dynamic object. A location may be a delimitated area of the 3D scene accessible to an object of the 3D scene, or it may be a volume of the 3D scene wherein an object of the 3D scene is encompassed. Said otherwise, a location may be a site in the 3D scene occupied or available for occupancy by one or more objects. Locations and static objects are closely related. Indeed, movements of dynamic objects within the layout are limited by the static objects that defining surfaces or volumes in the 3D space that cannot be traversed by dynamic objects. For instance, in FIG. 2, the object 210 representing a car is a dynamic object that can enter or leave the garage 200. The walls of the garage 200 are static objects. The ground of the garage (delimited by the walls) is reachable by dynamic objects, and can therefore be identified as a location. In a second step, each location is filed with its maximum occupancy of objects that reaches the most expensive computing cost. Filling a location with its maximum occupancy of objects means that objects are placed on the location, and that the number of objects placed on this location is the maximum number of objects allowed on the location. This maximum number of objects is a characteristic of the location that can be defined by a scenario that is played by or applied on the 3D scene. The scenario is realistic with regard to the simulated real-world and limits the possible actions of objects in the 3D scene. For instance, in FIG. 2, the location "garage" (that is, the ground of the garage) can comprise one car and many users. In practice, the filling of a location with its maximum occupancy of objects is performed with dynamic objects only. In a next step, a maximum computing cost is computed for each location of the 3D scene. The most expensive computing cost for a given location is reached when the maximum number of objects acceptable on the location is reached and when the objects are instantiated at least with a maximal realism. Hence, a maximum cost situation analysis is performed: each location of the virtual world is analyzed in its maximum CPU cost situation. In the following step, the computing cost density of each location of the 3D scene is computed. This advantageously allows quantifying and characterizing the worst cost situations for all locations. In practice, a maximum computing cost density is computed and it refers to the computing cost per unit of surface or per unit of volume, depending on the location's type (an area, a volume). For instance, if the location is an area, as in the example of FIG. 2, then the maximum computing cost density will be the computing cost per unit of surface. In practice, a ratio P/A is computed for each location. P quantifies a percentage of a computing resource required for processing the location and A is an area (or a surface) of the location in the 3D scene. Then, a map of cost density of the 3D scene (also called the first map) is built from the aggregated maximum computing cost densities.

Figure 3:
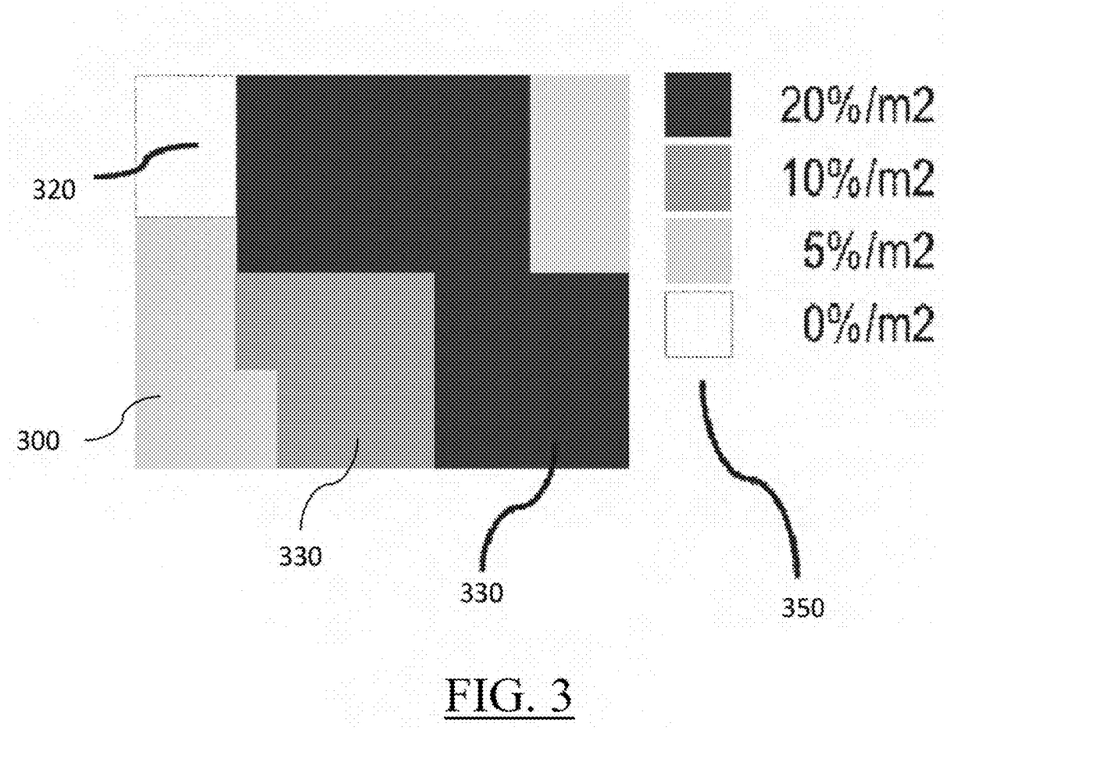
FIG. 3 shows an example of a map of cost density of FIG. 2.

FIG. 3 shows an example of the representation of the first map for the 3D scene of FIG. 2. Five locations 200, 220, 230, 240 have been identified in FIG. 2 and their maximum computing cost density is represented on FIG. 3. A density is higher if a location has a higher probability of having many objects in the area, with many interactions. In the living room 230, the cost density 330 is 20%/m$^2$ (percent of a computer resource per square meter), while the small patio 200 has a cost density 320 equal to 0%/m$^2$ because it is a static area without evolution in a scenario of the 3D scene. In this example, the map of cost density has been built on the same plane as the projection plane of the 3D scene. A correspondence between the 3D scene and the first map is more easily represented and maintained. Once the map of cost density has been built, it may be displayed to the user. To this aim, the map may provide graphical Information 350 showing the computed maximum computing cost densities of a location of the 3D scene. For instance, a color scale 350 may be used for representing maximum cost density, as shown on FIG. 2.

At step S30, a second map is defined that represents constraints on the shapes of zones that will be obtained as a result of a partitioning of the 3D scene. The expression "shapes of zones" means allowed geometrical forms for one or more zones obtained as a result of the partitioning of the 3D scene. The second map thus limits the geometrical form(s) allowed for one or more zones. For instance, a zone can be a 2D shape that defines a surface such as, but is not limited to, a polygon with 3 or more edges. A zone might be a 3D shape that defines a volume such as, but is not limited to, a parallelepiped, a sphere. The second map aims at ensuring that the partition of the 3D scene will not cause problem from a computing resource point of view. The constraints of the second map avoid malfunctioning of a solver and conflicts between solvers, notably in terms of dynamic objects.

The locations identified for computing the first map can be used for defining the constraints. Especially, the locations may be determined from the static objects of the 3D scene, e.g. the wall of the 3D scene cannot be intersected by dynamic objects so that a room may define a location.

The identification of the locations can be generalized as follow. First, one identifies in the 3D scene one or more static objects of the 3D scene. For instance, and in reference FIG. 2, walls and stairs are static objects of the 3D scene. Then, for each static object identified, a geometry is computed. This computed geometry represents outline of the static object; the computed geometry can be contemplated as being a constraint for dynamic object, e.g. they cannot cross the computed geometry. The geometry is associated with a rule for creating an area on the 3D scene that will define a location. In the event the scene has been discretized into cells, as it will become apparent below, the rule creates one or more clusters of one or more cells.

Instead of relying only on the locations used for computing the first map, the second map may be built using the following three kinds of constraints that are identified in the 3D scene. The generalization of the concept of location discussed above can be applied, that is, a constraint will be obtained by identifying a static object, a geometry is computed from the static object, and a rule is associated to the computed geometry.

Figure 4:
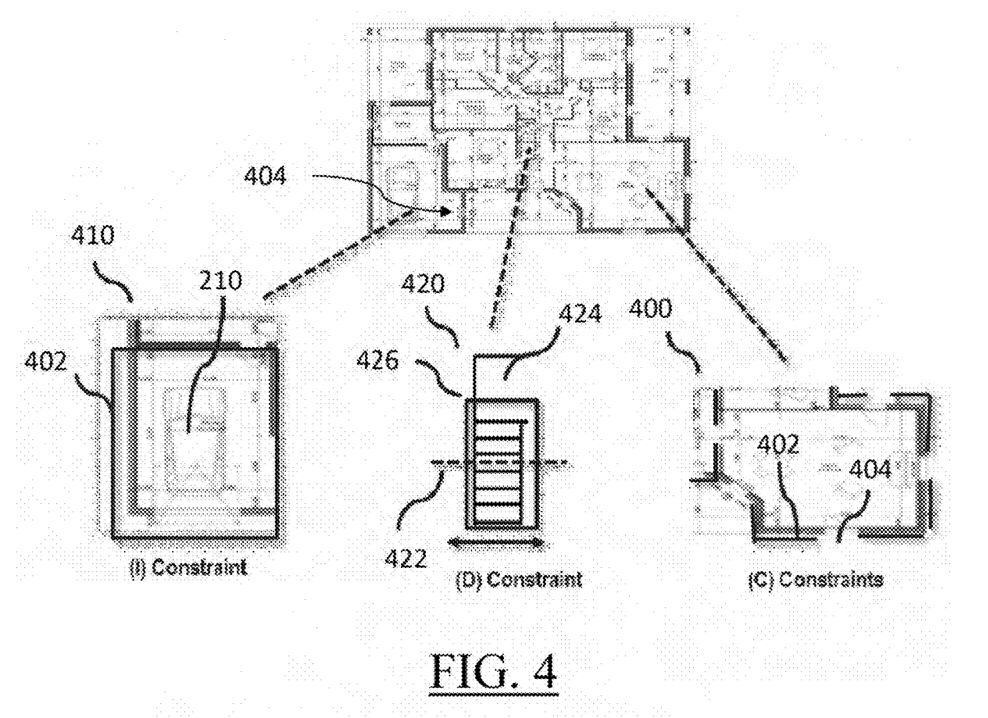
FIG. 4 shows an example of map of constraints of FIG. 2.

A first constraint is referred to as "do not Cross" constraint and is noted "C" constraint. The computed geometry is a line or polyline. The line or the lines of the polyline should never be intersected by a dynamic object. Preferably, other zones (or partitions) of the 3D scene in contact with this computed geometry should coincide with the line(s). This constraint "C" aims at splitting zones in areas where objects will never interact with one another. In the example of FIG. 4, a "C" constraint 400 coincides with walls 402, except at door locations 404, as no piece of furniture or human can cross there. The rule associated with the polyline defines that the surface of the 3D scene in contact with the polylines and almost included within the polyline form a zone.

A second constraint is referred to as "take Integrality" and is noted "I" constraint. The computed geometry is a polygon, and the rule associated with the geometry defines that the surface enclosed within the polygon (that is, entirely included in the polygon) form a zone. The "I" constraint prevents additional, complex, expensive, sometimes impossible computations, which result from breaking splitting this area into two or more zones. In FIG. 4, "1" constraint 410 comprises as geometry the rectangle 402 that prevents from "cutting" the car 210 into two parts, which could be problematic to simulate. Interestingly, the geometry 402 does not encompass the area 404: indeed, this area is too small for receiving the car 210 so that there is no risk that the car is cut into two part if the area 404 is attached to another zone.

The third constraint is referred to as "follow Direction" and is noted "D". The computed geometry is a polygon, and the rule associated with the geometry is a direction and a magnitude. The direction and the magnitude are represented by a vector. The rule associated with the geometry defines that the surface enclosed within the polygon (that is, entirely included in the polygon) form a zone and that a further surface that extends outside the polygon, from an edge of the polygon, in accordance with the vector, is added to the zone. For instance, in FIG. 4, the "0" constraints 420 comprises the polygon 426 encloses the stairs 422, and the vector extends the polygon 426 from the top edge of the polygon for creating an additional surface 424 (e.g. the landing serving the stairs) that belongs to the zone; by this way, assuming that descending or climbing the stairs by a dynamic object requires the crossing of two contiguous zones, it will always be performed at once with a one shot transfer of the object from a zone to the other without any oscillation.

The identification of the constraints in the 3D scene can be automatically performed. This automatic identification can be based on an analysis of the static objects in the 3D scene. Then, the identified static objects can be associated with a rule in accordance with an analysis of the dynamic objects that may be present in the neighborhood of the static objects, that can be performed according to (i) an history of the objects that were and/or are located near the identified static objects, and/or (ii) one or more parameters associated with the static objects that indicate a category of the static objects—for instance, the parameter can indicate that the static object is a wall, or a stairway, . . . . For instance, the system executing the method can discover that the static objects of the garage are "walls" and that a dynamic object "car" is or has been located within the neighborhood of these static objects. As another example, the stairway 422 can be associated with a parameter that indicates that this static object 422 is of the type stairway, and as a result a rule associated with the computed geometry 426 is a direction and a magnitude for creating a landing 424 serving the stairs.

The identification in the 3D scene of one or more static objects of the 3D scene may be performed upon user action. A designer designing the 3D scene, or a user that needs to simulate the 3D scene, designates the static objects that should constrain the shapes of zones to be created. As a result of the user's action, a geometry is automatically computed. The geometry can be modified by the designer/ user. Alternatively, the designer/user can directly draw the geometry.

The association of a rule with a computed geometry may be performed upon user action, that is, the user selects the type of rule to apply of the automatically computed geometry or on the geometry be modified or drew. For instance, after the creation of a geometry, the designer/user is automatically proposed a menu of rules that can be selected, being understood that one rule can be associated with one computed geometry.

At this stage of the method of the invention, two maps have been obtained from the 3D scene: a first map that represents cost density of the 3D scene and a second map that represents constraints for on the zones that will be obtained as a result of the method.

Then, at steps S40 to S42 of FIG. 1, the 3D scene provided at step S10 is discretized into cells after the computation of a quantum for discretization. Discretizing the 3D scene means that the 3D scene, for instance the 3D scene projected on the plane as illustrated on FIG. 2, is divided into a set of cells, wherein each cell has the same size (that is, the same surface). The cells are thus surface quantum, and the number of cells will depend on the computed quantum as the whole 3D scene is discretized. The cells may be 20 cells: the 3D scene is represented as a 2D plane as Illustrated on FIG. 2 and the cells are 2D surfaces. The cells may be 3D cells: the volume created by the 3D scene in a 3D space is divided into cells that are 3D volumes. Altogether, the cells cover the entire 3D scene. The space quantization of the 3D scene is computed for a 3D scene free of dynamic objects. This means that the discretization of the 3D scene does not take into account of the dynamic objects on the 3D scene. The space quantization of the 3D scene can be computed as follows.

At step S40, a surface quantum noted Sq is computed by use of the relation (1)

$$Sq = (CPU_{CA}) / (\text{density of computing costs})_{Max} \quad (1)$$

where $CPU_{CA}$ represents an accuracy of a computer resource cost for processing the zones and (density of computing costs)$_{Max}$ represents the highest density represented on the first map.

The accuracy $CPU_{CA}$ of the computing resource represents the accuracy with which the designer/user wants to partition the 3D scene in terms of CPU cost. Hence, for areas with a lower cost density, the Surface quantum Sq, with which the geometry of a zone will be adjusted, will necessarily represent less than the Cost Accuracy. The accuracy $CPU_{CA}$ of a computing resource thus represents a sensitivity with which the scene will be discretized; the expression "adjusting sensitivity" can be used for designating the accuracy CPU. In fact, a value of a surface quantum (Sq) is dictated by the first map that represents the cost density of the 3D scene: indeed, one needs to determine the maximum of the percentage of the variation of the load of a solver after the addition or the withdrawal of such a quantum. At step S42, the 3D scene is discretized into cells that all have a size equal to the surface quantum Sq.

Figure 5:
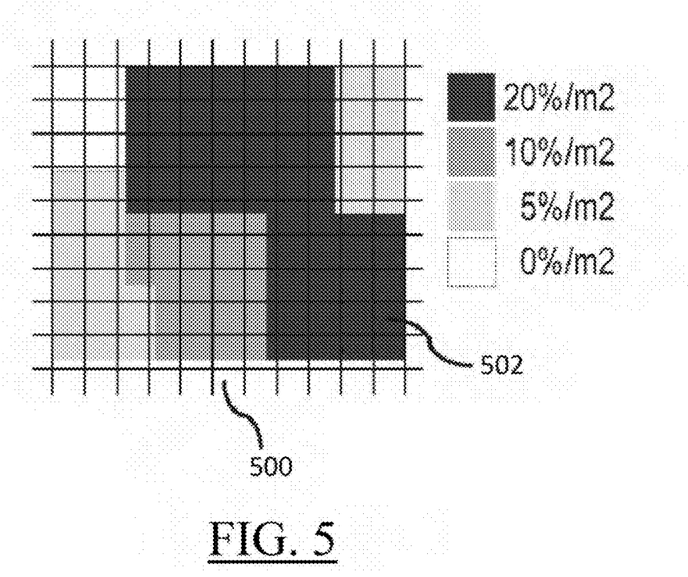
FIG. 5 shows an example of the map of FIG. 3 discretized into cells.

FIG. 5 shows an example of the first map of the 3D scene represented on FIG. 3 that is discretized into cells of surface quantum Sq. This example shows the relation between the cells that discretize the 3D scene and the map of cost density of the 3D scene. One understands that the 3D scene and the first map superimpose: they have the same size. Alternatively, one of the two is smaller with a given size factor. The pattern of the cells is the same for all cells: here, the 3D scene is divided into N cells that are squares of the same size. The 3D scene is thus discretized according to a grid mesh, which step is the square root of the Surface Quantum. The use of a grid mesh makes easier the creation of zones, notably when the 3D scene model infrastructures such as digital mockups of buildings, e.g. factories. It is to be understood that the discretization can be applied as well for other regular meshes, or variable meshes as well.

Still in reference to FIG. 5, the mesh has been obtained with a CPU Cost Accuracy set to 5% and with a highest density of 20% per square meter. This leads to the creation of a regular mesh (502) of square cells with a Surface quantum of a quarter (¼) of a square meter, and as a square mesh is chosen, the scene is discretized according to a square grid of a half (½) meter step (500). In this example, the accuracy is set to 5%, which means that the CPU cost of a cell can vary with a maximum precision noted A=±ε where ε≤±5%. Thus, the value of ε is 5% for a density 20% (black square on FIG. 5), 2.5% for a density 10%, and 1.25% for a density of 5%.

Next, at step S50, a computing cost is computed for each cell of the discretized 3D scene. This computation is carried out from the first map of the 3D scene obtained at step S20. The computing cost of a given cell is given by the mathematical product between the surface quantum $S_q$ of the given cell and the density of computing cost of the cell. The surface quantum $S_q$ of the given cell has been computed at step S40. The density of computing cost of the given cell is obtained from the first map computed at step S20. The output of the step S50 is a new map that comprises the same set of cells as previously obtained for the 3D scene, wherein each cell is associated with a computing cost of the cell.

Figure 6:
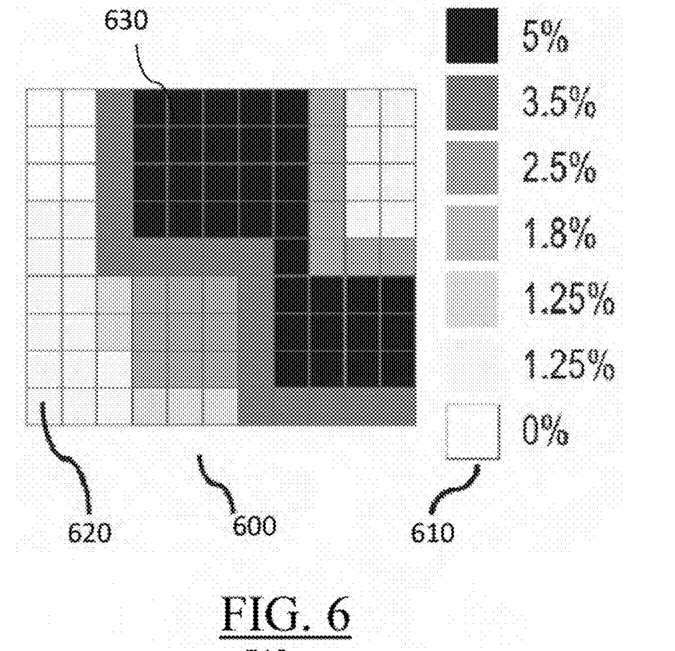
FIG. 6 shows an example of the map of FIG. 3 that forms a cost density map.

FIG. 6 shows an example of this new map obtained with the step S50. The new map is referred to as Discretized Cost Map 600, and comprises the percentage of CPU cost of each cell discretizing the 3D scene. For Instance, the cell 620 has a computing cost that is equal to zero. As another example, the cell 630 has a computing cost that is equal to 5%. This means that a computing resource in charge of the cell 630 needs 5% of its computing resource for processing the cell 630. One understands that summing up all the Cell Costs of the grid mesh indicates a quantity of computing resources required for running the 3D scene. In addition, the Discretized Cost Map provides information about how many zones will be able to simulate the 3D Experience in real-time. In the example of FIG. 6, the sum of the costs of all the cells of the grid is about 296%. Three zones can be defined, each zone having an overall cost that is lower to 100%. Each zone is associated with a computing resource and should securely cope with the scene in real-time.

Then, at step S60, one or more clusters of one or more cells are computed in accordance with the second map. The one or more dusters aim at reducing the number combination of cells at the time of defining the zones. Indeed, assuming the scene discretization has N cells, there are NI ways to gather these cells into parts with a cost close to (but always lower than) 100% of the computing resources available to a solver. The purpose of this step is to constitute clusters of cells so that the (C), (I) and (D) constraints represented on the second map are implicitly verified by these clusters, simplifying following stages. As a noticeable consequence, this diminishes significantly the combinatorial to explore.

Figure 7:
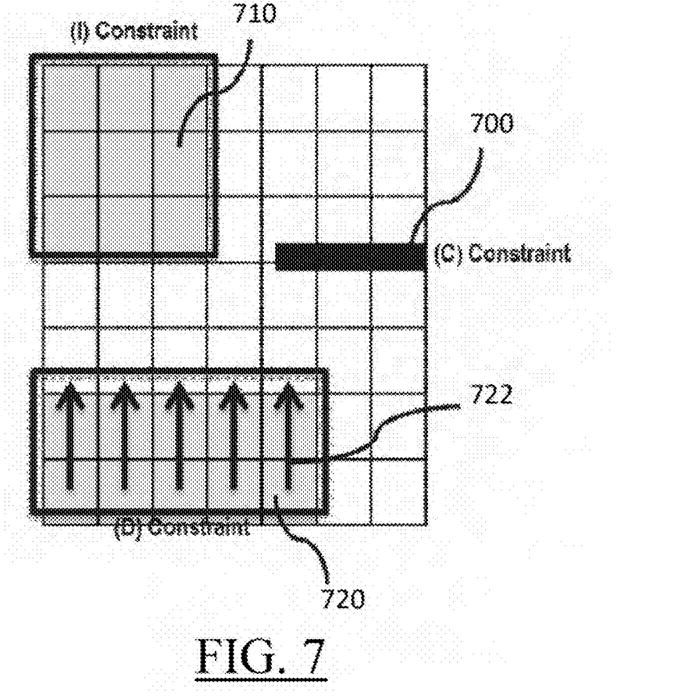
FIG. 7 shows an example of types of constraints that can be identified in a 3D experience.

FIG. 7 illustrates examples of the constraints on the discretized second map of FIG. 4. The "C" constraint 400 of FIG. 4 has a computed geometry that is a polyline, and one of the lines of the polyline 700 is represented on FIG. 7. The "I" constraint 410 of FIG. 4 has a polygon as computed geometry that encloses several duster 710 on FIG. 7. And the "D" constraint 420 of FIG. 4 has also a polygon as computed geometry represented 720 on FIG. 7.

The "C" constraint 700 is associated with a rule that triggers the creation of a cluster for each cell that border the polyline. In other terms, all cells located around the geometry (here a line of a polyline) of a "C" constraint are not aggregated together. Each cell that borders the line 700 is associated with a specific value label; more specifically, and as illustrated on FIG. 8, cells on one side of this constraint are labeled with this value 800, and cells on the opposite side are labeled with the opposite value 802. Thus, any further cluster aggregation should be penalized when having cells with opposite label, while rewarded when having cells with same labels.

The "I" constraint 710 of FIG. 7 is associated with a rule that creates a cluster of cells with the cells that are included in the polygon. Hence, all cells located within the same (I) constraint 710 form a single cluster 810 as represented on FIG. 8, which is handled as a whole in further steps of the method. It should be noted that the resulting cost of an (I) cluster should not exceed 100% of the computing resources available of a computing resource. Otherwise, it means that the scene contains an area, which will never be real-time for the computing resources chosen for simulation and with which the Map of Cost Density has been built. In the event a cluster obtained from a constraint "I", "D" or "C" requires 100% or more of available computing resources, a reduction of the Surface Quantum can be triggered and a redo of the discretization of the 3D scene executed.

Figure 8:
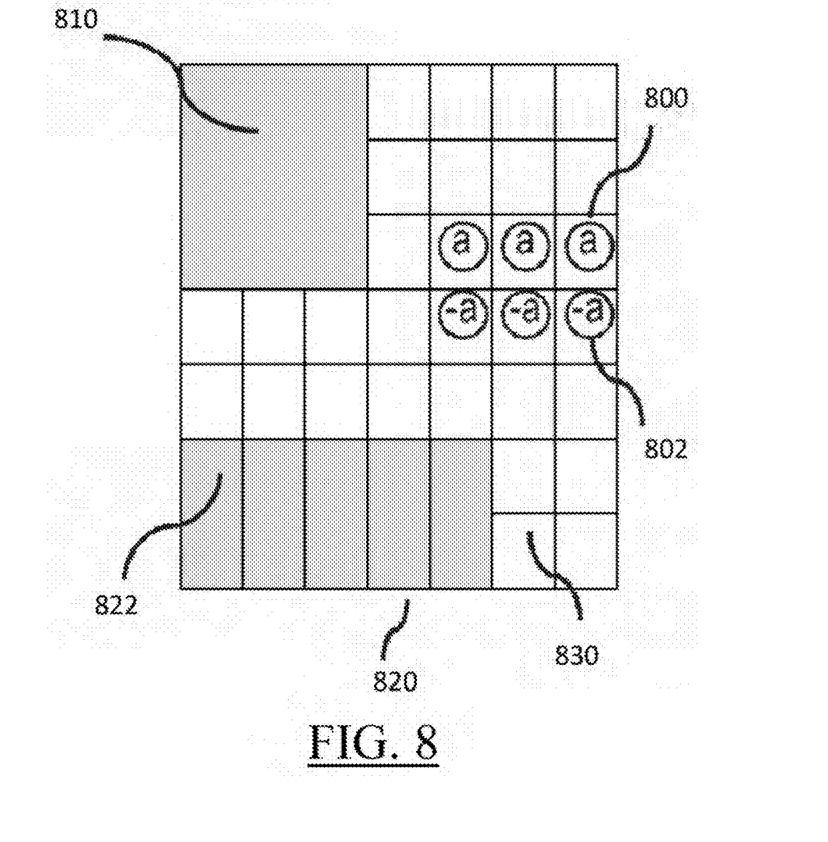
FIG. 8 shows an example of the map of FIG. 4 discretized into clusters of cells.

The "D" constraint 720 of FIG. 7 is associated with a rule that creates one or more clusters with the cells enclosed in the geometry. Each cluster created from a "D" constraint comprises at least one cell enclosed in the geometry and one or more cells that extend from this at least one cell in the geometry (the polygon) according to the direction and the magnitude represented by the vector 722. In this example, all cells located within the same (D) constraint 720 are arranged into slices clusters 822 parallel to the direction of the constraint 722. Said otherwise, any duster aggregate with such a (D) cluster in its periphery will inherit of a border with the appropriate shape. The cost of such slice clusters should remain quite below 100%.

Cells 830 that do not belong a to cluster created from constraints "I", "D" or "C" are considered as one cell cluster, such as for instance the cell 830 on FIG. 8.

Next, at step S70, the clusters are aggregated into one or more zones. Each zone obtained as a result of the aggregation has a computing cost that is the sum of the computing costs of the cells that belong to the zone. The computing cost of the zone allows a real-time simulation of the zone on a computing resource. Said otherwise, the computing cost of each zone should remain below 100% of the computing resource available to the solver.

The zone shaping is a so called bin packing problem: it consists in aggregating clusters to form parts with a CPU cost closer to (but less than) 100% and minimizing a cost function explicated later on. The aggregation of cluster is preferably carried out with a combinatorial optimization algorithm. The combinatorial optimization performed by the algorithm aims at finding optimal aggregations of clusters among all the combination of clusters that can be obtained when considering that the CPU cost has to be close to 100%, but does not exceed this threshold. That is, the algorithm computes all the combinations of aggregations that are possible according to the computing costs of the dusters. There are NI ways to aggregate the N clusters. For determining what the best solution among the combinations is and for limiting the number of combinations to compute, the algorithm may take as input one or more criteria representing objectives to be reached. An objective function can be used to determine the best solution according to the one or more criteria. The objective function of the combinatorial optimization algorithm is formulated for increasing at least when:

(i) a number Z of zones has increased as a result of a new aggregation of the cells into one or more zones. For instance, the increase of the objective function can be proportional the square of variation of Z;

(ii) the shapes of zones are jagged border. In this case, the increase of the objective function is proportional to a number of concavities, and/or a number of convexities, and/or to the ratio between the perimeters of the zones and their surfaces;

(iii) the number of disconnected zones is larger than 0. A Zone is disconnected, when it is topologically not possible to go from any location to any other location of this zone without exiting from one of its boarder and reentering into one of its border. In such a situation, the increase of the objective function can be proportional to the cubic variation of Z (Z);

(iv) Z zones comprise a number K of clusters obtained from "I" constraint with opposite label values. The gain K used in the cost function can be initially set at a randomly chosen value, and then calibrated empirically, or tuned by algorithms such as in Control Theory or Machine Learning. This calibration can be performed while the simulation is running. The increase of the objective function can be proportional to the square variation of Z ($Z^2$).

A combinatorial optimization algorithm such as Ant Colony Algorithm can be used to find an optimal solution within a reasonable time frame. It is to be understood that any other suitable combinatorial optimization algorithm can be used.

The invention claimed is:

1. A computer-implemented method for partitioning a 3D scene into a plurality of zones, each zone representing an area or a volume of the 3D scene and being processed by a computing resource, the method comprising:

obtaining a 3D scene comprising one or more objects, each object generating a computing resource cost;

computing a first map that represents a density of computing costs of the obtained 3D scene;

defining a second map that represents constraints on the shapes of zones that will be obtained as a result of a partitioning of the 3D scene;

computing a value of a space quantization of the 3D scene free of dynamic objects, a dynamic object being an object that is moveable in the 3D scene;

discretizing the provided 3D scene into cells of a same size limited by the computed value;

computing, for each cell, a computing cost from the first map of the 3D scene; and aggregating the cells into one or more zones in accordance with the second map, each zone having a computing cost that is the sum of the computing costs of the cells belonging to the zone, the computing cost of the zone allowing a real-time simulation of the zone on a computing resource, wherein the computation of the space quantization of the 3D scene further comprises:

computing a surface quantum $S_q$ defined by the relation $$S_q = (CPU_{CA})/(\text{density of computing costs})_{Max},$$

wherein ($CPU_{CA}$) represents an accuracy of a computer resource cost for processing the zones and (density of computing costs)$_{Max}$ is the highest density represented on the first map, and discretizing the provided 3D scene into cells, each cell having a size equal to the surface quantum $S_q$.

2. The computer-implemented method of claim 1, wherein the aggregation of the cells into one or more zones is further carried out with a combinatorial optimization algorithm.

3. The computer-implemented method of claim 2, wherein the combinatorial optimization algorithm is an Ant colony algorithm.

4. The computer-implemented method of claim 2, wherein an objective function of the combinatorial optimization algorithm is formulated for increasing at least when:
   a number N of zones has increased as a result of a new aggregation of the cells into one or more zones,
   the shapes of zones are jagged border, and
   the number of disconnected zones is larger than zero.

5. The computer-implemented method of claim 1, further comprising, before the aggregation of the cells:
   computing one or more clusters of one or more cells in accordance with the second map,
   wherein the aggregating step further comprises aggregating the clusters into one or more zones, each zone having a computing cost that is the sum of the computing costs of the cells belonging to the zone, the computing cost of the zone allowing a real-time simulation of the zone on a computing resource.

6. The computer-implemented method of claim 1, wherein the constraints on the shapes of the zones represented on the second map are obtained by:
   identifying in the 3D scene one or more static objects of the 3D scene, a static object being an object that cannot move in the 3D scene and that cannot be traversed by another object, and
   for each static object identified, computing a geometry that is associated with a rule that creates one or more clusters of one or more cells.

7. The computer-implemented method of claim 6, wherein the association of a geometry and a rule for creating clusters of cells is one among:
   the geometry is a polygon and the rule creates a cluster of the cells that are included in the polygon,
   the geometry is a polygon and the rule creates a cluster of the cells that extends from the polygon according to a direction and a magnitude that are represented by a vector, and
   the geometry is a polyline and the rule triggers the creation of a cluster for each cell that borders the polyline.

8. The computer implemented-method of claim 7, wherein the association of a rule with a computed geometry is performed upon user action.

9. The computer-implemented method of claim 6, wherein the identification in the 3D scene of one or more static objects of the 3D scene is performed upon user action.

10. The computer-implemented method of claim 1, wherein the computation of the first map that represents a density of computing costs of the provided 3D scene, further comprises:
    determining a set of locations in the 3D scene,
    filling each location with its maximum occupancy of objects that reaches the most expensive computing cost,
    computing, for each location of the 3D scene, the maximum computing cost, and
    for each location, computing a ratio P/A, wherein P is a measured percentage of a computing resource required for processing the location and A is an area of the location in the three-dimensional scene.

11. The computer-implemented method of claim 10, wherein the step of filling each location with its maximum occupancy of objects is performed for dynamic objects.

12. The computer-implemented method of claim 1, wherein computing, for each cell, a computing cost from the first map of the 3D scene further comprises computing the product between the surface quantum $S_q$ and density of computing cost of the cell.

13. A non-transitory computer readable medium having stored thereon a program comprising instructions that when executed by a computer causes the computer to perform a method for partitioning a 3D scene into a plurality of zones, each zone representing an area or a volume of the 3D scene and being processed by a computing resource, the method comprising:
    obtaining a 3D scene comprising one or more objects, each object generating a computing resource cost;
    computing a first map that represents a density of computing costs of the obtained 3D scene;
    defining a second map that represents constraints on the shapes of zones that will be obtained as a result of a partitioning of the 3D scene;
    computing a value of a space quantization of the 3D scene free of dynamic objects, a dynamic object being an object that is moveable in the 3D scene;
    discretizing the provided 3D scene into cells of a same size limited by the computed value;
    computing, for each cell, a computing cost from the first map of the 3D scene; and
    aggregating the cells into one or more zones in accordance with the second map, each zone having a computing cost that is the sum of the computing costs of the cells belonging to the zone, the computing cost of the zone allowing a real-time simulation of the zone on a computing resource,
    wherein the computation of the space quantization of the 3D scene further comprises:
    computing a surface quantum $S_q$ defined by the relation $$S_q = (CPU_{CA})/(\text{density of computing costs})_{Max},$$

wherein ($CPU_{CA}$) represents an accuracy of a computer resource cost for processing the zones and (density of computing costs)$_{Max}$ is the highest density represented on the first map, and discretizing the provided 3D scene into cells, each cell having a size equal to the surface quantum $S_q$.

14. The non-transitory computer readable medium of claim 13, wherein the aggregation of the cells into one or more zones is further carried out with a combinatorial optimization algorithm.

15. The non-transitory computer readable medium of claim 14, wherein the combinatorial optimization algorithm is an Ant colony algorithm.

16. The non-transitory computer readable medium of claim 13, wherein the method further comprises, before the aggregation of the cells: computing one or more clusters of one or more cells in accordance with the second map, and
   wherein the aggregating step further comprises aggregating the clusters into one or more zones, each zone having a computing cost that is the sum of the computing costs of the cells belonging to the zone, the computing cost of the zone allowing a real-time simulation of the zone on a computing resource.

17. A system comprising:
   a processor coupled to a memory and a graphical user interface, the memory having recorded thereon the computer program for partitioning a 3D scene into a plurality of zones, each zone representing an area or a volume of the 3D scene and being processed by a computing resource, that when executed causes the processor to be configured to:
   obtain a 3D scene comprising one or more objects, each object generating a computing resource cost,
   compute a first map that represents a density of computing costs of the obtained 3D scene,
   define a second map that represents constraints on the shapes of zones that will be obtained as a result of a partitioning of the 3D scene,
   compute a value of a space quantization of the 3D scene free of dynamic objects, a dynamic object being an object that is moveable in the 3D scene,
   discretize the provided 3D scene into cells of a same size limited by the computed value,
   compute, for each cell, a computing cost from the first map of the 3D scene, and
   aggregate the cells into one or more zones in accordance with the second map, each zone having a computing cost that is the sum of the computing costs of the cells belonging to the zone, the computing cost of the zone allowing a real-time simulation of the zone on a computing resource,
   wherein the processor is further configured to compute the space quantization of the 3D scene by being configured to
   compute a surface quantum $S_q$ defined by the relation $$S_q = (CPU_{CA})/(\text{density of computing costs})_{Max},$$

wherein ($CPU_{CA}$) represents an accuracy of a computer resource cost for processing the zones and (density of computing costs)$_{Max}$ is the highest density represented on the first map, and
   discretize the provided 3D scene into cells, each cell having a size equal to the surface quantum $S_q$.

18. The system of claim 17, wherein the aggregation of the cells into one or more zones is further carried out with a combinatorial optimization algorithm.

19. The system of claim 18, wherein the combinatorial optimization algorithm is an Ant colony algorithm.

* * * * *